June 28, 1932.  F. C. REINEKING  1,864,936
DISPENSING CAN
Filed June 18, 1931  2 Sheets-Sheet 2
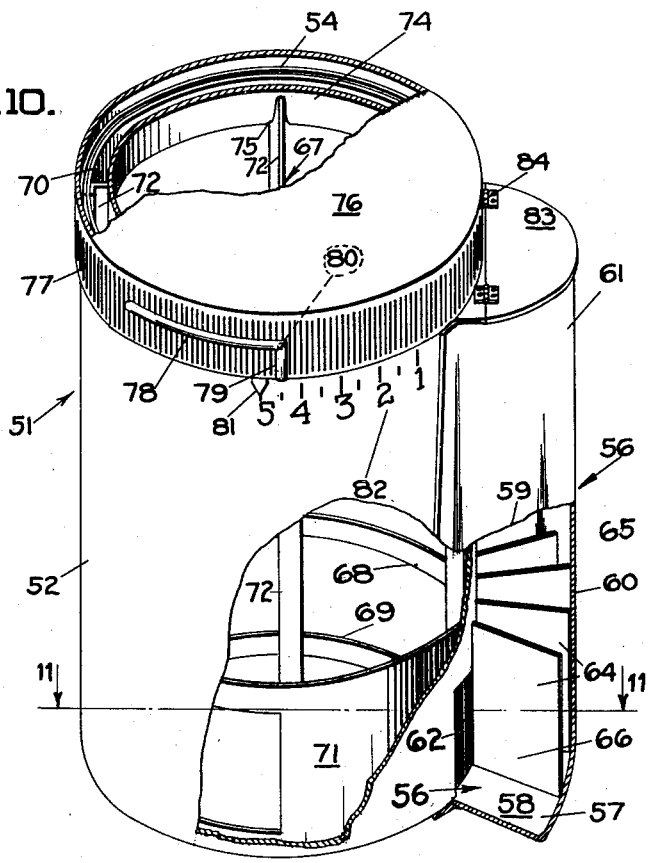
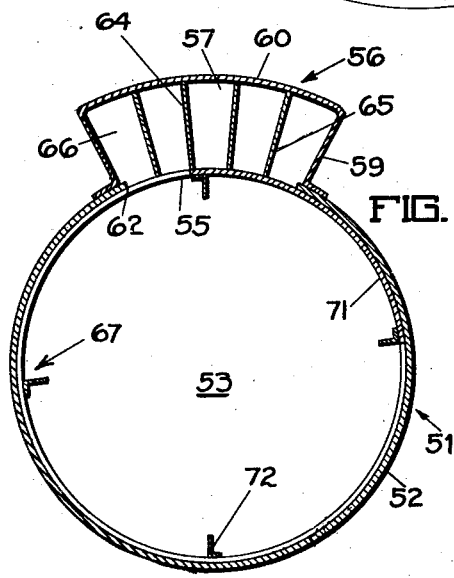
INVENTOR
F.C.REINEKING
BY Hazard and Miller
ATTORNEYS Patented June 28, 1932

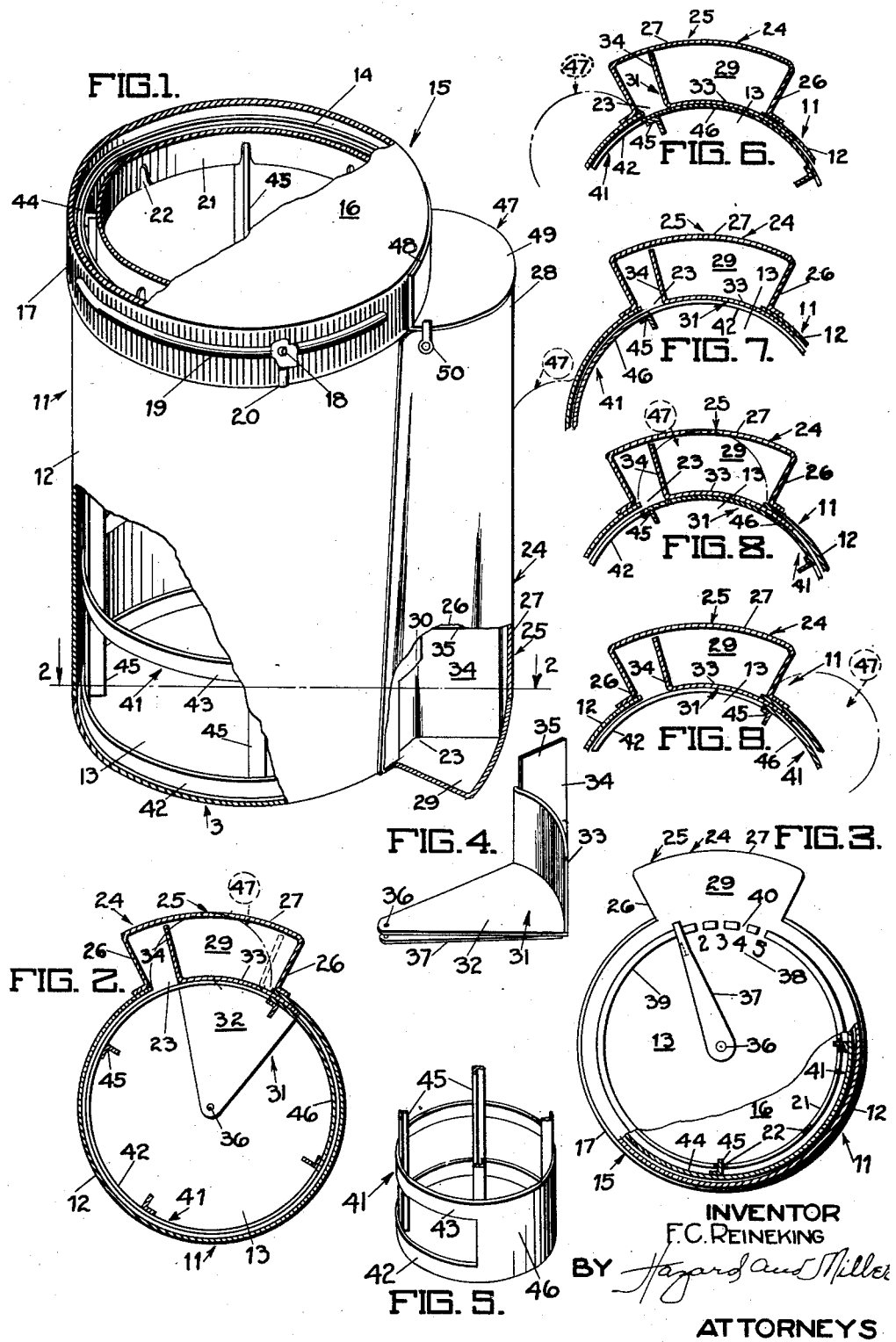

1,864,936

UNITED STATES PATENT OFFICE

FREDERICK C. REINEKING, OF INGLEWOOD, CALIFORNIA

DISPENSING CAN

Application filed June 18, 1931. Serial No. 545,228.

My invention relates to dispensing cans designed to dispense or allow pouring out of the cans of measured quantities of powdered or granular material. The dispensing can is principally designed as a kitchen article and also a can in which merchandise may be marketed so that for household purposes the contents of the can may be measured in desired quantities and then be poured from the can.

In this type of can an object and feature of my invention is the provision of a pouring spout which may be attached to one side of the can and in this spout there is a measuring chamber connected to the lower part of the can. Such measuring chamber may be controlled to decrease or increase its size and thus regulate the amount of material which may flow from the can to this chamber, and after the chamber is filled it may be cut off by a closure from the main contents of the can and the material in the measuring chamber poured out of the spout.

Another object and feature of my invention relates to the control of the capacity of the measuring chamber to obtain the variable quantities desired, and to effect this I employ a scale on the can with a movable device which increases or decreases the cubic contents of the measuring chamber and at the same time forms an opening between the measuring chamber and the main body of the can to allow the flow of the contents of the can into such chamber.

Another feature of my invention controlled by turning the cover of the can forms a closure or seal between the measuring chamber and the body of the can when it is desired to pour material from the measuring chamber.

Another detail feature of my invention is the employment of a closure cap for the spout which will prevent pouring of material from the spout while it is being measured and until the measuring chamber is filled. Then, in order to close off the measuring chamber from the body of the can, it is necessary to open the spout to allow pouring of the contents.

Another feature of my invention relates to a construction by which the opening from the main body of the can to the measuring chamber may be left open and also the cap at the spout may be opened to allow continuous pouring of the contents of the can.

In one form of my invention I employ a measuring valve which is centrally pivoted in the bottom of the can and has an indicator arm on the outside of the can which operates over a scale and thus determines the quantities to be measured. This valve has a vertical, radial partition which operates in the spout, and also has a circular closure plate forming a closure for the port leading into the body of the can. In connection with this I employ a rotatable cage having a second or main closure valve for closing the port, this being rotatable by rotating the cover or lid of the can. With this type of invention, shifting the cover to engage the cage in a different manner allows for maintaining the cage open and the spout also open, the cap for the spout being connected with the cover for the can.

In another type of my invention I provide the spout with a series of vertical partitions and utilize a cage rotated by the cover or lid to open the ports leading from between these partitions to the main body of the can and thus by filling the space between one or more partitions measuring the material.

My invention is illustrated in connection with the accompanying drawings, in which:

Fig. 1 is a perspective view of my invention partly broken away to show interior details;

Fig. 2 is a horizontal section on the line 2—2 of Fig. 1 in the direction of the arrows;

Fig. 3 is a bottom view taken in the direction of the arrow 3 of Fig. 1;

Fig. 4 is a perspective view of the measuring valve;

Fig. 5 is a perspective view of the lower part of the cage with the main closure valve;

Fig. 6 is a partial view similar to Fig. 2 showing the main closure valve in closed position and the measuring valve in a partly open position;

Fig. 7 is a view similar to Fig. 6 with the main valve fully opened to fill the measuring chamber;

Fig. 8 is a view similar to Fig. 6 to form a double seal;

Fig. 9 is a view similar to Fig. 6 showing a free pouring position;

Fig. 10 is a modified construction using a series of fixed partitions for measuring;

Fig. 11 is a horizontal section on the line 11—11 of Fig. 10 in the direction of the arrows.

In my invention I employ a main can 11 which is indicated as having a cylindrical side 12, a flat bottom 13, an open top 14 with a lid or cover 15 fitted thereon; this lid has a top piece 16 and a depending annular flange 17. The body of the can has a projecting nub 18 at the top which is adapted to engage in a partly circular groove 19 pressed outwardly from the flange 17 and a longitudinal groove 20 also pressed outwardly. The can cover or lid also has an internal depending ring 21 secured to the top portion 16 and this has a series of notches 22. At the bottom of the can there is an arcuate port or pouring opening 23.

Built onto the side of the can there is a pouring spout designated generally as 24. This at the bottom is provided with a section forming a measuring chamber 25. The measuring chamber portion has radial sides 26 and an outside wall 27 concentric with the wall 12 of the can. These walls gradually change in shape, merging together and forming a circular wall section 28 at the top. This may be part of the cylinder if desired. The port 23 extends substantially from the side walls 26 in an arcuate direction and from the bottom 29 of the measuring chamber to a horizontal edge 30 of the portion of the side wall of the can 12 above the port. This, then, gives a rectangular shaped opening following the curvature of the wall 12 of the can.

The measuring valve designated generally at 31, illustrated in Fig. 4, employs a segmental bottom plate 32 with an arcuate closure gate 33, this being formed as a flange and at right angles to the plate 32. The curvature of this gate is concentric with the side wall 12 of the can and fits closely thereagainst. A valve plate 34 is attached to one end of the gate 33. This has the upper end 35 extending above the top edge of the gate. A pivot 36 is centrally located in the bottom 13 of the can and forms a pivot on which the measuring valve operates, the bottom plate 32 fitting closely on the inside on the bottom 13 of the can, the closure gate 33 being adapted to close the port 23 in the side of the can, and the valve plate 34 extending radially into the measuring chamber. In order to operate this measuring valve, the pivot 36 is provided with an indicating arm 37. This arm operates over a series of numerals 38 in the bottom of the can which show the degree of opening of the valve for measuring different cubic contents of material. In order to conveniently bring this valve to rest at desired points there is a raised annular ridge 39 formed in the bottom of the can with a series of notches 40 therein, the notches facilitating a ready registry of the arm 37 with any of the numerals 38.

A combined agitator and cage 41 is fitted inside of the can, this having a lower ring 42, an intermediate ring 43, and an upper ring 44. These rings are connected by longitudinal bars 45 indicated as formed of angles, and between the rings 42 and 43 there is a main closure gate 46 whereby the agitator has the double function of agitating material in the can when it is rotated and also the gate 46 forming a closure for the port 23.

This agitator with its gate is rotated by means of the cover 16, this cover being inserted on the can by passing the nub 18 into the longitudinal groove 20 until the horizontal groove 19 is brought into registry with the nub 18 and then the can lid may be rotated. The ring 21 on the inside of the lid by means of the notches 22 engages the bars 45 and thus facilitates rotation of the cage 41 with its valve.

A closure for the open end of the spout is provided by a closure cap 47, this cap having an arcuate portion 48 attached to the flange 17 of the lid having a horizontal cap piece 49, this being adapted to bear on the upper circular portion of the spout when closed. A pivot detent 50 may be utilized as a stop for the movement of this closure cap.

In the operation of the device, presuming the can contains pulverized or granular material which it is desired to measure in quantities indicated by the numerals 38, the arm 37 may be rotated until it points to the desired numeral, in which case the pivot 36 carries the valve 31 so that the gate 33 will open the port 23 of the can and the valve plate 34 will move in the arc of a circle through the bottom portion of the mixing chamber. It is usual while this is being done to have the agitator 41 with its cage positioned so that the gate 46 forms an entire closure for the port 23 as indicated in Fig. 6. This prevents flowing of material from the body of the can into the measuring chamber even should the valve 31 be opened. In Figs. 2 through 9 the position of the cap 47 is indicated in dotted lines so that when the main closure valve is closed the cap 47 for the spout is in its open position.

In Fig. 1 the agitator and the gate valve 46 are illustrated turned to a position which fully opens the port leading from the main body of the can into the measuring chamber and allows the contents of the can to flow therein. In this position the cap 47 is indicated as forming a closure for the top of the spout, this cap abutting against the pivot abutment stop 50. Then if it is desired to pour the material which has been measured, the lid 16 is rotated, thus rotating the agitator and the gate 46 into the position of Fig. 6, which closes the connection to the body of the material and allows pouring of the material in the measuring chamber through the open ended spout.

When it is desired to make the dispensing device for free pouring without measuring, the lid 16 may be lifted off the top of the can and replaced so that the bars 45 fit in different notches. For instance, this lid may be shifted so that when the cap 47 for the spout is in its closed position the gate 46 is also in its closed position, as indicated in Fig. 8, this giving a double seal, the gate 46 preventing material flowing into the measuring chamber and, hence, the spout, and the cap 47 preventing such material flowing out should there be any in the spout. The lid 16 may then be rotated, for instance, into the position shown in Fig. 9, which opens the port 30 for free passage of the material from the body of the can to the measuring chamber and at the same time removes the cap 47 and allows pouring of the contents of the can without restriction through the open end of the spout. This gives what might be termed a free pouring use of the can. If the can is only to be used for measuring, the stop 50 may be left permanently in its upper position to engage the cap 47, but if the device is to be used for free pouring, this can be tilted down to allow movement of this cap in an opposite direction. It will be seen, therefore, by my construction, that the agitator will mix and loosen the material so that it will flow freely through the port 23, and even when the can is substantially empty it may be tilted slightly on its side with the measuring chamber lowermost to allow the material to flow into this measuring chamber. Usually with pulverized or granular material and by giving the can a slight shaking the pouring chamber may be filled to the desired level, that is, to the top 30 of the opening of the port 23. The plate 34 has the upward extension 35 to prevent the material from overflowing back of the gate 33.

In the construction of Figs. 10 and 11, the cam 51 has a cylindrical wall 52, a circular bottom 53, an open top 54, a port 55 adjacent the bottom; a side chamber 56 forming a spout with a measuring chamber part 57 constructed at the bottom with a base 58 forming a continuation of the bottom 53 of the can; radial sides 59, and an arcuate outer wall 60, this being concentric to the wall 52 of the can. This spout also tapers and has, preferably, a circular upper section or pouring end 61, vertical edges 62 of the port 55 substantially in alignment with the radial sides 59, the top edge being of a desired height. A series of fixed radial partitions 64 are mounted in the measuring chamber, these extending between the wall 60 and the wall 52 of the can and, preferably, have upward extensions 65 reaching above the upper edge of the port 55, this being to prevent material overflowing from the receptacle 66 between one partition and another.

This device is provided with the combined agitator and valve plate designated 67, this having lower, middle, and upper rings 68, 69, and 70 with a gate 71 connected between the lower and the middle ring. A series of vertical agitator bars 72 connect these rings, these bars being illustrated as angles, and are attached at the top to a ring 74, this ring being notched as indicated at 75. The ring 74 is attached to the lid or cover 76, which lid has a depending flange 77, the flange having an outwardly pressed groove 78 and a longitudinal groove 79 connecting therewith. These grooves register with a nub 80 projecting from the body of the can.

The flange of the lid is provided with an indicating pointer 81 which operates over a scale 82, this scale having numerals indicating the various capacities of the measuring chamber. A cover 83 for the spout is indicated as being connected with hinges 84.

In the manner of using the device of Figs. 10 and 11, the lid is inserted on the can with the nub 80 entering the longitudinal grooves 79 and such nub retaining the lid when the nub operates in the groove 78. The gate 71 connected to the agitator opens one or more of the receptacles or pockets 66, the number opened being registered on the scale 82. Therefore, when a receptacle is open the material from the bottom of the can may flow into such receptacle, the receptacle or receptacles thus measuring the quantity of material. When it is desired to pour this material from the measuring chamber, the cover and the agitator are rotated until the port 55 is closed, then the material between the partitions may be poured out of the spout, the cover 83 hinging to an open position to allow such pouring. This device at any time may be used for free pouring by opening the port 55 leading to one or more of the receptacles 66 and opening the cover 83 for pouring material out of the spout. It will be readily seen that my type of dispensing can may be used in the initial sale of various produce and, in addition, it can be refilled in the home with goods purchased in ordinary cans or packages.

Various changes may be made in the details of construction without departing from the spirit or scope of the invention as defined by the appended claims.

I claim:

1. A dispensing can having a cylindrical can body with a measuring chamber exterior to said can body and connected thereto by a connecting port, the can having a series of indicia indicating various quantities of material, means operative exterior to the can to register with said indicia, and a rotary valve controlled thereby to open said port varying degrees for the flow of material from the can body to the measuring chamber, and means for pouring the measured material from said chamber.

2. A dispensing can having a can body with a measuring chamber connected thereto by a port, a first valve forming a closure for said chamber, means to move said valve varying degrees to measure variable quantities of material, such material flowing into said chamber, a second valve, means to operate said valve to close said port after measurement of the desired quantity, and means for pouring the measured material from the measuring chamber.

3. A dispensing can as claimed in claim 2, the second valve being connected to an agitator to agitate the material in the can body, and means to simultaneously operate the agitator and the second valve.

4. A dispensing can having a can body with a structure forming a measuring chamber connected thereto by a port, a first valve forming a closure for said port and having means to vary the space in the measuring chamber for the reception of material, a second valve to close said port after measuring of the desired quantity of material, and means for pouring material from the measuring chamber.

5. A dispensing can having a can body, a side structure connected thereto and having a measuring chamber therein with a port connecting to the can body, a first valve forming a closure for said port and having means to vary the space in the measuring chamber and the inlet to said space from the can body, a second valve forming a closure for said port and operated after the passage of material to the chamber, and a structure for pouring the measured material from the measuring chamber.

6. A dispensing can as claimed in claim 5, the structure for pouring the material having a cap, and means to simultaneously move the cap with the closure of said valve to open said structure.

7. A dispensing can having a can body, a side structure connected thereto and having a port at the bottom, the bottom portion of such structure forming a measuring chamber and the upper portion a pouring spout, a first valve having a closure means for said port and having a second means to vary the space in the measuring chamber to receive material, means to operate said valve graduated amounts, a second valve forming a closure for said port and operated to open and close such port, said valve when closed preventing material flowing from the can body into the measuring chamber to permit pouring of the measuring quantities through the spout.

8. A dispensing can as claimed in claim 7, said can body having a lid connected to the second valve, a cap for the spout connected to the lid, the movement of the second valve to its closed position opening said cap for pouring of the material.

9. A dispensing can having a cylindrical can body, a side structure connected thereto by a port at the bottom, said structure forming a measuring chamber at the bottom and a pouring spout at the top, a first valve having an operative means extending through the bottom of the can to close said port and to open said port varying amounts, and a movable partition structure connected to said valve to vary the space in the measuring chamber in accordance with the position of said valve, a lid for the can, a second valve connected to the lid to form a closure for said port, the measured material being adapted for pouring from the chamber on the closure of the second valve.

10. A dispensing can as claimed in claim 9, the second valve having an agitator connected thereto, a cap for the spout, and means to interconnect the lid and the agitator in varying positions to prevent an opening of the second valve and the free pouring of the contents of the can.

11. A dispensing can having a cylindrical can body, a side structure connected thereto, there being a port at the bottom, said side structure at the bottom forming a measuring chamber and at the upper portion forming a spout, a first valve having a control means extending through the bottom of the can and having an arcuate gate to form a closure for the port and a radial partition to vary the space in the measuring chamber, a lid on the can, an agitator in the can having a second valve to control said port, said agitator being operated on rotation of the lid to open or close the port independent of the action of the first valve.

12. A dispensing can as claimed in claim 11, the spout having a cap connected to the lid, the second valve when in closed position locating the cap in an open position as regards the spout to pour the measured quantities of material, and said lid having an adjustable connection with the agitator and the second valve to open said port and the spout after a free pouring of material.

13. A dispensing can having a can body with a measuring chamber connected thereto by a port, said chamber having a plurality of partitions dividing same into a plurality of receptacles, a movable valve forming a closure for the port and operable to connect one or more receptacles to the can body, and means for pouring material from any one or more of said receptacles.

14. A dispensing can having a can body, a side chamber connected thereto with a port at the bottom, a plurality of partitions in the side chamber at the bottom forming receptacles in a measuring chamber, the upper portion of said side chamber comprising a pouring spout, a valve operable in the can to close said port and to open same varying degrees to connect one or more receptacles with the can body, and a lid on the can connected to said valve.

15. A dispensing can comprising a cylindrical can body having a side structure with a port forming a connection at the bottom, the lower portion of said structure forming a measuring chamber and the upper portion a pouring spout, the measuring chamber having a plurality of radial partitions connecting through said port with the interior of the can body, a rotatable agitator in the can body having a valve connected thereto to open said port varying degrees, a lid on the can connected to the agitator, said lid being rotatable varying degrees.

16. A dispensing can having a cylindrical can body, a side structure connected thereto with a port at the bottom, said side structure having a measuring chamber at the bottom and a pouring spout at the top, the measuring chamber having a series of radial partitions, an agitator having bars parallel to the axis of the can and having an arcuate valve to close said port, a cap rotatable on the can connected to the agitator, and indicia on the can to show the degree of rotation of the lid.

17. A dispensing can having a cylindrical can body with a measuring chamber exterior to the cylindrical side of the can and connected thereto with a port leading to such chamber, rotary means to open and close said port varying degrees, and said rotary means having a mounting to retain same adjacent the inside of the cylindrical wall of the can body, and a structure connected to the measuring chamber for pouring the measured material from such measuring chamber.

18. A dispensing can having a cylindrical body with a measuring chamber formed exterior to the cylindrical side of said body and connected thereto by a port leading to such chamber, a rotary means exterior to the can and connected to a rotary device in the can and operating contiguous to the cylindrical side of the can to open said port varying degrees to permit flow of material from the can body to the chamber, a separate means to close said port, and means for pouring the measured material from the chamber.

19. A dispensing can having a cylindrical can body, a measuring chamber exterior to the cylindrical side of the can body and connected thereto by a port, an arcuate rotary means operating contiguous to the inside cylindrical wall of the can to open said port varying degrees, an agitator operated by said opening means to agitate material in the can body, said port opening means forming a closure after the chamber is filled to the desired extent, and a structure for pouring material from the chamber.

20. A dispensing can having a can body, a structure forming a measuring chamber connected to the can body by a port, an arcuate valve movable in an arcuate direction forming a closure means for said measuring chamber, means to open said valve varying degrees for flow of material from the can body to the measuring chamber, and a separate means to close said port, and a structure for pouring the measured material from said chamber.

In testimony whereof I have signed my name to this specification.

F. C. REINEKING.